United States Patent

[11] 3,568,810

| [72] | Inventor | Ben O. Daniels<br>Elmhurst, Ill. |
|---|---|---|
| [21] | Appl. No. | 779,816 |
| [22] | Filed | Nov. 29, 1968 |
| [45] | Patented | Mar. 9, 1971 |
| [73] | Assignee | Continental Can Company, Inc.<br>New York, N.Y. |

[54] CAP TURNOVER DEVICE
8 Claims, 7 Drawing Figs.

[52] U.S. Cl. ................................................ 193/43,
198/33
[51] Int. Cl. .................................................. B65g 11/20
[50] Field of Search .......................................... 193/43, 43
(D); 198/33 (R1)

[56] References Cited
UNITED STATES PATENTS
2,270,713  1/1942  Belada ........................ 193/43(D)

| 2,440,959 | 5/1948 | Krueger ........................ | 193/43(D) |
| 3,095,957 | 7/1963 | Roberts et al ................ | 193/43(D) |
| 3,261,442 | 7/1966 | Beck ............................ | 193/43(D) |
| 3,342,305 | 9/1967 | Ochs ............................ | 198/33(R1) |

*Primary Examiner*—Andres H. Nielsen
*Attorney*—Greist, Lockwood, Greenawalt & Dewey

ABSTRACT: A chute for delivering jar caps from a hopper or other supply source which is adapted to be disposed in an inclined position so that caps emerging from the hopper will pass by gravity between a pair of top and bottom pin wheels which control the turning movement of the caps, allowing those which are properly oriented, that is, those having the top panel uppermost, to pass without turning and continue down the chute but causing those which have the open side uppermost to turn, as they advance down the chute, to properly oriented position for application to jars in a processing line.

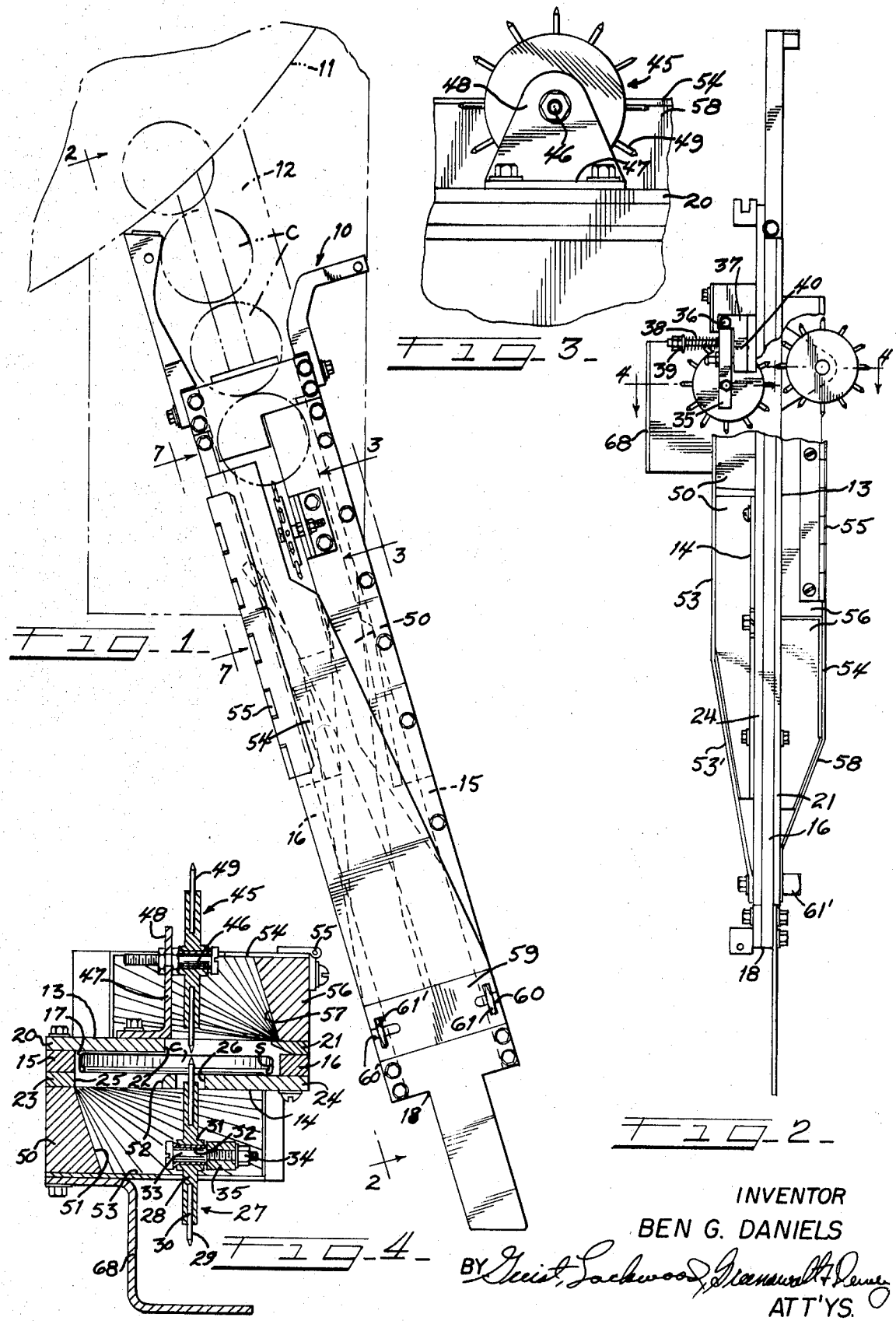

PATENTED MAR 9 1971

INVENTOR
BEN G. DANIELS
BY Grist, Lockwood, Greenawalt & Dewey
ATT'YS.

CAP TURNOVER DEVICE

This invention relates to an apparatus for feeding and positioning caps for the closing and sealing of jars, bottles and the like, and is more particularly concerned with improvements in apparatus which will accept a line of caps in random arrangement, from a hopper or other supply source, and deliver the caps in predetermined order to processing equipment, for example, automatic container sealing means or the like.

Some cap-feeding chutes which will accept a line of caps in random arrangement from a hopper or other supply source and deliver the caps at a predetermined rate, or at a rate automatically determined by the rapidity with which they can be accepted by a container capping machine or like equipment, with the caps arranged with the tops thereof presented upwardly and their bottoms downwardly for application to the containers supplied to the capping machine, have heretofore been developed. One such cap-feeding chute of this general character which has been provided is disclosed in U.S. Pat. No. 3,261,442, granted to Douglas E. Beck, dated Jul. 19, 1966. The chute in this patent is equipped with a pin wheel for turning the caps which are upside down and for directing them into a guide channel which turns the upside down caps to the proper position as they advance down the same. This and other previously designed equipment has been employed successfully in commercial operations. However, in some instances and under certain adverse conditions jamming and improper operation have been encountered which it has been felt is due, in part, to loss of control of the movement of the caps through the feeding chute. It is an object, therefore, of this invention to provide an improved cap-feeding chute of this type in which provision is made for a more adequate control of the caps at the turnover point and for allowing the passage, without jamming, of a larger percentage of caps having some degree of deformation which are frequently delivered from the supply source.

It is a more specific object of the invention to provide a cap-feeding chute having incorporated therein cap aligning and arranging mechanism which will not retard the caps appreciably as they are advanced and which will turn caps having their tops facing in the wrong direction into the opposite direction so as to arrange the caps with the tops all facing in the same direction within the chute.

It is another object of the invention to provide an improved cap-feeding chute wherein caps with the tops facing in one direction are advanced in a path through the chute without turning while caps having the tops facing in the opposite direction are rotated about a diametrical axis while they are advancing in the chute so that all of the caps are delivered at the end of the chute with the tops facing in the same direction.

It is still another object of the invention to provide a cap-feeding and orienting chute which is positioned to receive the caps in the upper end in random orientation from a cap supply source, such as a hopper, which will operate with high efficiency in turning caps which are upside down so as to arrange all of the caps in a uniform manner within the chute and which is designed with sufficient clearance for the caps so that caps which are to some degree deformed or out of shape will pass through the chute without jamming.

Another object of the invention is to provide a cap-feeding and orienting chute in which a pair of pin wheels are arranged above and below a cap guide channel so as to provide adequate control of the turning of the upside down caps and thereby insure that all of the caps will be arranged in a uniform manner within the chute for delivery with the tops thereof all facing in one direction.

These and other objects and advantages of the invention will be apparent from a consideration of the cap-feeding chute which is shown by way of illustration in the accompanying drawings wherein:

FIG. 1 is a plan view of a cap-feeding chute which incorporates therein the principal features of the present invention, the chute being shown in a position for receiving caps from a supply hopper;

FIG. 2 is a side elevation of the cap-feeding chute, the view being taken on the lines 2—2 of FIG. 1, and having portions broken away;

FIG. 3 is a fragmentary side elevation, the view being taken on the line 3—3 of FIG. 1, to a larger scale;

FIG. 4 is a cross section to a larger scale, the view being taken on line 4—4 of FIG. 2;

Figure 7:
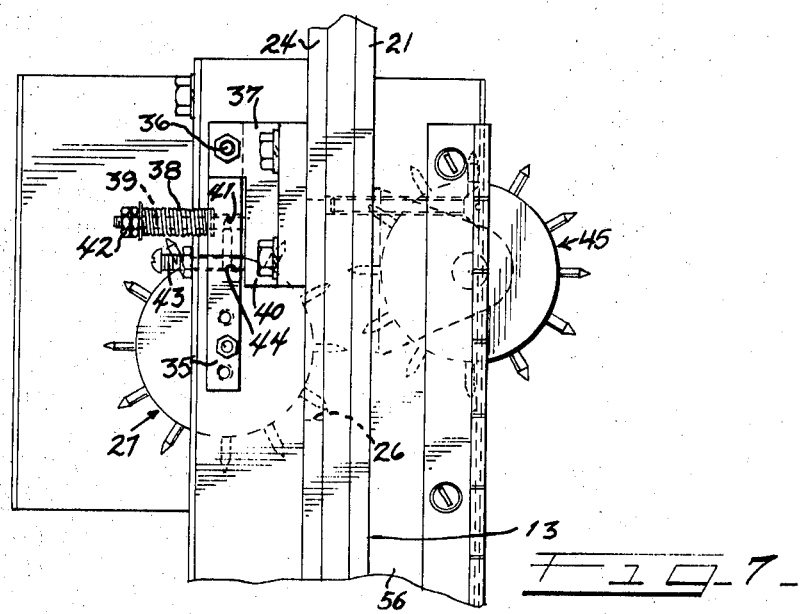
FIG. 7 is a partial side elevation to a larger scale, the view being taken on the line 7—7 of FIG. 1.

It is the general practice to provide, for use with automatic container sealing or capping machines, an apparatus for supplying caps at a predetermined rate so as to maintain the sealing machine in continuous operation with the caps arranged in proper position for application to successive containers which are handled by the capping machine. The present apparatus is designed to accept jar or bottle caps in random arrangement from a hopper and to deliver them properly oriented for application to the containers in the sealing machine. The cap-feeding chute 10 which is illustrated in the drawings is particularly designed to supply the caps continuously and in proper position with the tops of the caps facing in the direction required for application to the containers, and with the caps delivered by gravity at a rate determined by the speed of the capping machine.

The chute 10 is arranged in a generally vertical, downwardly inclined position and is associated with the hopper, indicated at 11 in FIG. 1, which delivers a single line of caps to the receiving area 12 at the upper end of the chute 10 with the tops of the caps disposed in random relation, that is, some facing downwardly in the chute and others facing upwardly. The hopper 11, for example, may be of the type disclosed in U.S. Pat. No. 3,269,514, dated Aug. 30. 1966. The chute 10 comprises a top plate structure 13 and a bottom plate structure 14. The two plate structures 13 and 14 are separated by side edge forming bars or rails 15 and 16 which are in parallel spaced relation, which extend the length of the chute and which cooperate with the top and bottom plate structures 13 and 14 to define a guideway 17 in which the caps travel between the cap-receiving area 12 at the upper end of the chute and a discharge opening 18 at the bottom or lowermost end of the chute 10. The normal depth of the guideway 17, which is determined by the thickness of the bars 15 and 16, is sufficient to accommodate the caps C, which the chute is designed to receive, when they are received in position to pass through the chute without being turned over, that is, with the topside uppermost.

Figure 6:
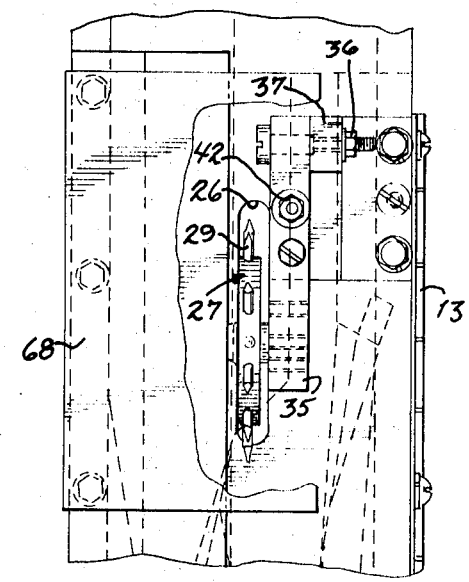
FIG. 6 is a partial bottom plan view to a larger scale.

The top plate structure 13 is formed by two plate sections or members 20 and 21 separated by a longitudinally extending slot 22 which permits upward movement of a portion of the cap which is required to be turned or oriented in the course of its travel through the passageway 17. The slot 22 varies in width so as to permit the cap to move freely while it is being turned through 180°. The bottom plate structure 14 is likewise formed by two plate sections 23 and 24 separated by a longitudinally extending slot 25 which varies in width so as to permit downward movement of a portion of the opposite side of the cap C which is to be oriented while it is advanced in the passageway 17. The two slots 22 and 25 are in part laterally offset relative to each other so as to guide the cap during its rotation about a diameter thereof. The two bottom plate sections 23 and 24 are fixed in position on the bottom of the chute and one bottom plate 24 is provided near the cap-entering end of the chute with a relatively short, elongate slot 26 (FIGS. 4 and 6) for accommodating a pin wheel 27 which senses the position of the caps as they enter the passageway 17 and tilts any cap which enters the passageway in upside down position, that is, with the top face downwardly, so as to start the cap turning about a diametric axis as it advances in the top and bottom guide slots 22 and 25.

The pin wheel 27 (FIGS. 4, 5 and 6) comprises a circular disc 28 which forms the body thereof and a plurality of pins 29 which are seated in peripherally spaced, outwardly opening, radial bores 30 which are of a depth relative to the length of the pins 29 to permit the pins to project a predetermined distance beyond the periphery of the disc 28, the distance being slightly less than the depth of the peripheral skirt S on the cap C. The pins 29 are pointed and have slightly blunt outer ends. The disc 28 has a hub portion 31 with a bore 32 for mounting on a short shaft 33. The shaft 33 is formed by a headed pin secured by a threaded end and nut 34 on the free end of a supporting arm 35 (FIGS. 4 to 7) which is pivoted at its opposite ends at 36 on a bracket 37 depending from the bottom plate member 24. The arm 35 is urged in a counter-clockwise direction as viewed in FIGS. 2 and 7 to hold the pin wheel 27 in the slot 26 by compression spring 38 mounted on a supporting pin 39 which depends from mounting block 40 on the bottom plate member 24 and extends through a hole 41 in the arm 35. The free end of the pin 39 is threaded and receives a washer and nut assembly 42 so as to permit adjustment of the compression in the spring 38. A set screw 43 extends through a threaded bore 44 in the arm 35 with its end adapted to engage the lower face of the block 40 so as to limit the movement of the arm 35 and enable the position of the pin wheel 27 to be adjusted.

A top pin wheel 45 which is of the same construction as the bottom pin wheel 27 is mounted above the passageway 17 on a small shaft 46 which is supported in fixed position on an angle bracket 47, the latter being mounted on the top surface of the top plate section 20 with the one leg 48 in upstanding position for supporting the shaft 46. The axes of the shafts 33 and 46 are in vertical planes which are offset relative to each other as shown in FIG. 2, the bottom pin wheel 27 being positioned on the downstream side or somewhat in advance of the pin wheel 45 in the direction of the downward flow of the caps through the chute 10. The pin wheel 45 has circumferentially spaced pins 49 which are adapted to engage the top surface of the top panel of a cap C which is in properly oriented position, that is, with the top side T uppermost, in the passageway 17. This insures that a cap C advancing on the plate sections 23 and 24, which, when it reaches the pin wheel 27, has one side unsupported and overhanging the slot 25, will continue down the passageway 17 without any turning movement. The pins 29 on the lower pin wheel 27 will have no effect on the passage of the cap since they merely extend into the open bottom face of the cap.

The inner edge of the bottom plate section 23 terminates at the inner edge of a side guide rail 50, the latter having a downwardly and inwardly sloping inner face 51. This permits a cap C which reaches the pinwheel position with its top side T facing downwardly to be tilted by the pins 29 on the pin wheel 27 so that it pivots about the inner edge 52 of the bottom plate section 24, as a fulcrum, with one side of the cap being raised into the slot 22 in the top plate structure 13 and the opposite side of the cap being dropped through the slot 25 in the bottom plate structure 14. A guard plate 53 extends inwardly a sufficient distance to support a cap C which is being turned or oriented as it advances in the slot 25. The side guide rail 50 terminates short of the lower end of the chute as shown in FIG. 1 and the guard plate 53 is bent upwardly at 53' (FIG. 2) and has a widened terminal end portion secured directly to the bottom face of the bottom plate section 23 so as to lift the bottom edge of the cap which is being oriented back into the passageway 17. A top guard plate 54, which is similar to the bottom guard plate 53, and performs a similar function on the top of the chute, is hingedly mounted at 55 along its outermost edge at the top of the side guide rail 56 which is secured on the top surface of the top plate section 21. The top guard rail 56 has an upwardly and inwardly tapered inside face 57 and terminated somewhat beyond the middle of the chute structure. The lower end of the guard plate 54 has a downwardly bent portion 58 which extends to a widened and flattened bottom end portion 59 with the latter being notched at 60 and 60' on opposite side edges to receive thumb screws 61 and 61' which serve to lock the plate in position when it is closed over the slot 22, in which position it forms a top guide for insuring that caps do not rise out of the chute 22 as they turn while they advance down the chute. The top plate section 20 may be mounted at its upper end on a pivot so that it may be swung laterally of the chute to expose or open the slot 22 and permit access to the chute passageway 17 thereby facilitating removal of any caps which may, for any reason, fail to advance in the passageway 17.

An annular plate 68 is mounted on the bottom face of the bottom guide plate 53 at the pin wheel 27 so as to form a guard or shield for protecting the pin wheel.

Figure 5:
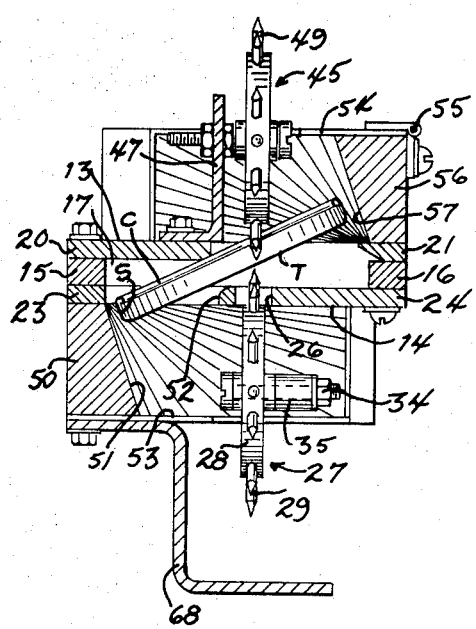
FIG. 5 is a cross section similar to FIG. 4 illustrating the turning of an upside down cap.

The two pin wheels 27 and 45 are shown in FIGS. 4 and 5 disposed in a common vertical plane. The top pin wheel may, however, be disposed in a plane offset relative to the plane of the bottom pin wheel, if found desirable, to hold the caps C in a horizontal position or to better control the caps which are tilted for turning about their axis.

The cap chute 10 which is illustrated is specifically adapted for handling jar caps C which are characterized by a top panel T and a depending peripheral skirt portion S. The caps C advance to the chute 10 from a suitable hopper or other supply source in a single line with some of the caps having the top panel T uppermost and other caps having the top panel T facing downwardly as the caps enter the chute passageway 17. The caps advance to the pin wheel 27 by gravity or by pressure exerted in the supply line due to the manner in which the caps are supplied. The pin wheel 27 is free to rotate in response to turning force resulting from engagement of the pins 29 with the caps as they move past the slot 26 through which the pins 29 on the wheel 27 project. When a cap C is right side up the open lower face will accommodate the pins 29 and the cap will advance in the passageway 17 in the same position in which it enters the chute, the wheel 27 merely rotating without any affect on the cap. The pins 49 on the top pin wheel 45 will engage the top surface of the panel T of a cap as the latter passes over the lower pinwheel 27 where it is supported only by the bottom plate 14 and the cap C will be prevented thereby from turning about the plate edge 52 so that there is positive control of the cap at this point. When a cap approaches the wheel in the upside down position (FIG. 5) the pins 29, which rotate in a vertical plane offset to the right of the centerline of the path as viewed in FIGS. 4 and 5, will engage the outside face of the top panel T, which now faces downwardly, and lift the one side of the cap so that the cap pivots around the edge 52 of the slot 25 in the bottom plate structure 14, and is oriented by turning in the guide slots 22 and 25 about an approximately diametrical axis as it advances down the chute. The spring mounting of the pinwheel 27 permits the wheel to yield when the pins 29 strike an unyielding portion of the cap, which may sometimes occur, as for example, the edge of the skirt S.

The arrangement of the two pin wheels at the turnover point provides positive control of the caps in the correct position to be accepted by the capping machine. The caps are held in a horizontal attitude by the top pin wheel while sliding through the section where they are unsupported on the left side (FIG. 4). Control of the right side up cap insures against inadvertent turnover of such cap and avoids delivery of an upside down cap to the capping machine. Absence of a rail or plate on the left side under an upside down cap at the pin wheel location allows a smooth unhindered turning operation. Also, the use of the two wheels enables the passageway to be enlarged so that there is sufficient tolerance to pass any deformed caps which may be fed out of the hopper and into the chute. Occasionally a cap may be damaged through handling and still pass out of the hopper and into the chute 10. With the increased dimensional tolerance permitted by the positive control exercised through the cooperating pin wheels, jamming in the chute is largely eliminated, and undesirable interruption of the operation of the capping machine is avoided.

I claim:

1. An apparatus for inverting closure caps of the type which are characterized by a top panel and a depending peripheral skirt, said apparatus comprising an elongate chute with a passageway of generally rectangular cross section for receiving at one end thereof a line of caps which are in a common plane and disposed with the top forming panels in random relation, the passageway being of a size to permit the caps to move freely from one end of the chute to the other end thereof, said chute having oppositely disposed, longitudinally extending guide slots which are positioned relative to the longitudinal axis of the chute to invert caps which are tilted about a diametrical axis as they advance in the passageway, a cap position-sensing wheel mounted for free rotation on an axis which extends transversely of the chute and which is resiliently supported adjacent the entrance end of the chute so as to allow the wheel to move in a path toward and from the chute, said wheel having radially extending spaced pins on the periphery thereof which normally extend into the passageway and move in the path of the caps, said wheel being located on one side of the longitudinal axis of the chute so that the pins will project into the open side of a properly positioned cap and not interfere with advancing movement of the cap in the passageway, and the top panel of an improperly positioned cap will be engaged by the pins and the cap tilted about a diametrical axis into said guide slots, and a cooperating wheel mounted for free rotation on an axis extending parallel with the axis of rotation of said cap sensing wheel and having radially extending, peripherally spaced pins which move in a path on the side of the passageway opposite the first wheel so as to engage the top panel of a properly positioned cap and prevent tilting of the cap as it advances along the guideway while permitting an improperly positioned cap to be engaged by the pins on the first wheel and tilted about its diametrical axis into said guide slots.

2. An apparatus for feeding closure caps of the type having a top panel and a depending peripheral skirt, comprising an elongate fed chute having a passageway of generally rectangular cross section for receiving at one end thereof a line of the caps which are in a common plane with the top forming panels in random relation, the passageway being of a size sufficient to permit the caps to move freely from one end of the chute to the other end thereof, said chute having plate structures defining the top and bottom walls of said passageway, said plate structures having longitudinally extending guide slots which are arranged relative to the longitudinal axis of the passageway to invert caps which are upside down by turning the same about a diametrical axis as they advance in the chute, a cap position-sensing wheel mounted for free rotation on an axis which extends transversely of the passageway adjacent the entrance end thereof, said wheel having radially extending, peripherally spaced pins which extend into the passageway and move in the path of the caps, said wheel being located on one side of the longitudinal axis of the passageway so that the pins will project into the open side of a cap which has the top side up and not interfere with advancing movement of the cap in the passageway and said pins will engage the top panel of a cap which has the top side down and turn the cap about a diametrical axis into said guide slots, and a second wheel mounted for free rotation on the side of the passageway opposite the first wheel and cooperating with said first wheel for controlling the movement of the caps past said first wheel.

3. An apparatus for feeding closure caps as set forth in claim 2, and said second wheel having radially extending, peripherally spaced pins positioned to engage the top panel of a cap which has the top side uppermost as said cap passes between said wheels.

4. An apparatus for feeding closure caps as set forth in claim 2, and said second wheel being mounted for rotation on an axis extending transversely of the passageway and in a plane normal to the longitudinal plane of said passageway and offset relative to a like plane in which the axis of said position-sensing wheel extends.

5. An apparatus for feeding closure caps as set forth in claim 2, and said second wheel being mounted for free rotation on an axis extending generally parallel to the axis of said position-sensing wheel and spaced upstream of said position-sensing wheel.

6. An apparatus for feeding closure caps as set forth in claim 4, and said second wheel having means on the periphery thereof which moves in a path to engage the top of a cap which has the top side up as it advances between said wheels.

7. An apparatus for feeding closure caps of the type having a top panel and a depending peripheral skirt, which apparatus comprises an elongate chute having a passageway of generally rectangular cross section for receiving at one end thereof a line of caps which are in a common plane with the top panels in random arrangement, the passageway being of a size sufficient to permit the caps to move freely from one end of the chute to the other end thereof, said chute having plat structures defining the top and bottom walls of said passageway with longitudinally extending guide slots which are arranged relative to the longitudinal axis of said passageway to invert caps which are upside down by turning the same about a diametrical axis as they advance in the slots, a cap position-sensing and turning station, a position-sensing wheel mounted for free rotation on an axis which extends transversely of said passageway at said station and which is resiliently mounted, said wheel having radially extending, peripherally spaced members which extend into said passageway and move in the path of the caps, said wheel being located on one side of the longitudinal axis of said passageway with said peripheral members moving in a path so as to project into the open side of a cap which has the top side up as it reaches said sensing and turning station and not interfere with advancing movement of the cap in said passageway, and said peripheral members being adapted to engage the top panel when an upside-down cap reaches said sensing and turning station thereby tilting the cap about a diametrical axis into said guide slots, and a second wheel mounted for free rotation having radially extending, peripherally spaced members mounted for movement in a path on the side of the passageway opposite the first wheel and cooperating with said first wheel for controlling the movement of the caps at said sensing and turning station.

8. An apparatus for feeding closure caps as set forth in claim 2, and said second wheel having said radially extending, peripherally spaced members positioned to engage the top panel of a cap which has the top side uppermost as said cap passes between said wheels.